Sept. 10, 1929.  J. M. THORP  1,727,737
METHOD OF BODY SUSPENSION FOR MOTOR VEHICLES
Filed May 5, 1927
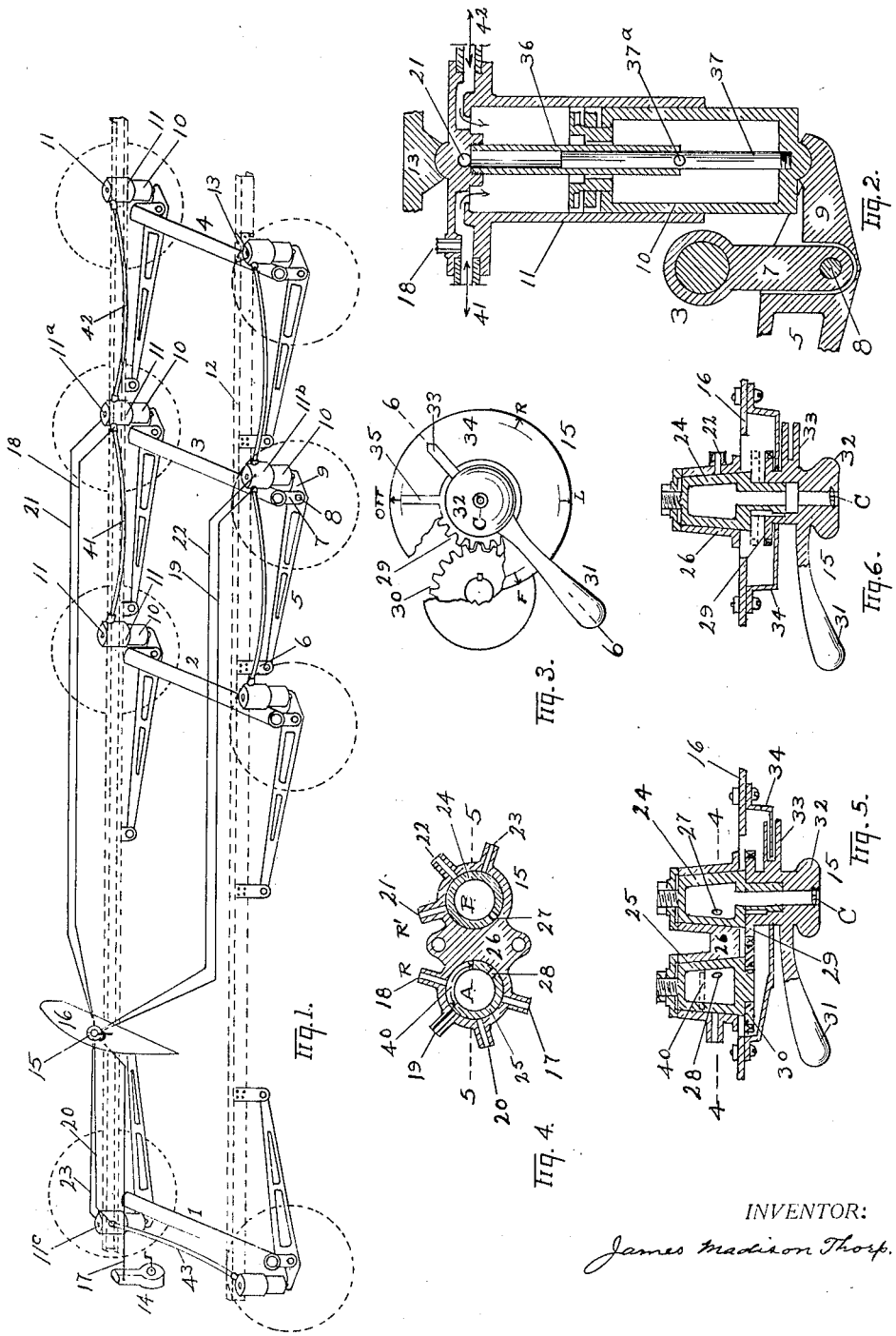
INVENTOR:
James Madison Thorp.

Patented Sept. 10, 1929.

1,727,737

UNITED STATES PATENT OFFICE.

JAMES MADISON THORP, OF ALAMEDA, CALIFORNIA.

METHOD OF BODY SUSPENSION FOR MOTOR VEHICLES.

Application filed May 5, 1927. Serial No. 189,074.

My invention relates to that class of motor vehicles employing air cylinders in lieu of steel springs.

It is well known that a load bearing upon the piston of an air cylinder will require a pressure of air, within the cylinder, sufficiently high to support the load and if the load is increased or diminished the pressure must be regulated accordingly, a slight variation of weight however, being cared for by a partial stroke of the piston in either direction, but if there is much variation such as the difference between a full load and a half load or less, with the same volume of air, the piston would reach the limit of its stroke and leave no play for up and down movement of the wheels when traveling over rough roads. Therefore it is necessary in practice to keep the air pressure at a point where the piston will stand at mid stroke, thus the full benefit of the resilient air is had either up or down at all times.

The present invention is primarily for use on multi-wheel vehicles with a cylinder for each wheel, and as such a vehicle varies the load weight frequently I have designed means whereby the supply of air pressure may be regulated semi-automatically to weigh the load at mid stroke of the pistons and this regulation may be done from the driver's seat while the vehicle is either at rest or traveling.

The accomplishment of the foregoing purpose is the particular object of my invention, other objects will appear as the description proceeds.

I am aware that air cylinders have heretofore been proposed as cushions between vehicle axles and body frame and that designs have been shown with two or more cylinders pneumatically connected, but in most instances these connections are made with valves interposed, and in one design the cylinders on one side of the vehicle are freely connected with those on the other or opposite side. Now this is absolutely impracticable for the following reasons:

In vehicle body support, or suspension as it is commonly called, three is the least number of points that will support any weight without very delicate balance; for example, take a vehicle of four wheels and four cylinders, freely connect the two rear cylinders also the two in front, we have a two point suspension; connect all four and the result is one point suspension; and in either case it is impossible to balance the load as the heaviest side or corner will sink to the limit and drive the air to the lightest side. Now isolate each of the two rear cylinders and give each one air pressure equal to its part of the load, the two front cylinders may be connected, this will give a three point suspension and the plan is workable. Yet none of these designs perform the functions required by my multi-wheel vehicle as hereinafter described and shown in the annexed drawings, in which, detail not directly necessary to the description of the present invention is omitted.

I will now describe the preferred manner of accomplishing the objects herein cited; reference being had to the accompanying drawings in which:

Figure 1, is an isometric diagram of a multi-wheel chassis with the axle ends broken away and showing only such standard parts as are necessary in the description of the present invention; Fig. 2, is a detail in vertical section of one of the controlling cylinders; Fig. 3, a face view of the control valves; Fig. 4, a vertical section of the valves through 4—4 of Fig. 5; Fig. 5, a horizontal section at 5—5 of Fig. 4; and Fig. 6, a section at 6—6 of Fig. 3.

The diagram, Figure 1, shows a set or series of three cylinders on each rear quarter of the vehicle, it is obvious, however, that a less number of wheels and cylinders may be employed with similar results as hereinafter set forth.

Similar characters of reference denote similar parts throughout the several views.

Referring to Fig. 1 of the drawing, the numerals 1—2—3 and 4 denote the vehicle axles, 5 is a radius arm swiveled at one end to the frame bracket 6, and hung at the other end by the pin 8 to the axle pendent arm 7, a continuation 9 of the arm 5 supports a piston 10 of the cylinder 11 which in turn supports the vehicle frame 12 by the cap bracket 13 which is riveted to the frame member. The foregoing description is typical of each supporting unit except that there is a difference in connecting pipes and an interior difference in the control cylinder as hereinafter described.

The numeral 14, indicates an air compressor operated by the motor, not shown; 15 is the control valve mounted upon the instrument board 16; 17, the air feed pipe from the compressor to the valve; 18 is the right hand control cylinder feed pipe; 19 the left hand control cylinder feed pipe and 20 the front, 21 the right hand escape pipe, 22 the left and 23 the front. All these pipes radiate from the control valve as shown in Fig. 1, and their connections to the valve is indicated in Fig. 4 by their respective numerals.

The control valve consists of two tapered plugs 24 and 25, ground into the casing 26 and provided with the ports 27, 28 and 40, and the warning whistle port C.

The gear 29 is slidably splined to one plug and the gear 30 keyed solid to the other so that both plugs may be operated simultaneously by the lever 31 which is fixed to the gear 29 and made integral with the knob 32 and pointer 33 which is designed to point upon the dial 34 the positions of the ports serving the various inlet and escape pipes.

Fig. 6 shows the bifurcated pointer as it appears when pulled out of the slot 35 in Fig. 3. This action disengages the gears and allows the plug 24 to be turned independent of the other plug which remains in closed position. Fig. 2 is a detail of the three control cylinders 11a—b and c, and by omitting the tubes 36, 37 and outlet 21 it is typical of the other five cylinders.

In operation:

Assuming that the vehicle frame is resting at its lowest limit with the pistons completely in the cylinders and with the tubes 36 of the control cylinders covering the ports 37a and the control valve set at Off on the dial, and the ports 28 and 27 as shown in Fig. 4, and the compressor in operation. The driver then grasps the lever 31 and turns the pointer to R on the dial, this will register the ports 28 and 27 with the ports 18 and 21 marked R and R' on Fig. 4. This indicates the right hand control cylinder 11a; the long plug slot 40 will then register with the pipe opening 17, allowing the compressed air to enter the plug bore A and thence through the opening 18 and R connection to the cylinder 11a and will raise it and the two cylinders connected by the pipes 41 and 42 until the tube 36 uncovers the port 37a, when the excess air will escape by the pipe 21 to the valve connection R' and thence into the plug bore B and out through the warning whistle C shown in Fig. 5.

During the foregoing operation the right hand series of three connected cylinders have been raised and set at mid stroke with pressure equal to that part of the load and the warning whistle has given notice to that effect, the driver then throws the pointer to L on the dial, this cuts off the right hand cylinders and opens the ports to the left hand series which are raised and set in a similar manner. He next moves the pointer to F and the two front cylinders are set likewise, the pointer is then moved to Off, thus cutting off all connections.

This arrangement provides a three point suspension, and yet the body is actually supported at eight different points somewhat comparable to the floating of a boat upon the water, any shock or excess pressure against any one wheel of the series is divided between all three and at no time is overloading of a wheel possible, it also prevents torsion of the body frame.

I have described the method of inflating the cylinders, assuming that this is done at full load. Now if the load is removed the air pressure will raise the cylinders to the upper limit and leave the vehicle with hard springs and without space for upward movement of the body, to overcome this, the pressure must be reduced so as to set the cylinders at mid stroke as before and with the pressure equal only to the diminished load. To do this only the escape plug B should be turned. It will be noted that in the previous operations the bifurcated pointer 33 straddled the dial plate 34, Fig. 5 and the gears were in mesh so as to turn both plugs simultaneously. To operate the escape valve alone the driver pulls out the knob 32 as in Fig. 6 while the pointer is in the slot at Off, this disengages the gears, then the pointer is turned to each successive position on the dial, the escaping air will sound the whistle until the controlling cylinder of that series drops to mid stroke and cuts off the escape port 37a, the ceasing of the whistle in this instance is the warning. Now all the cylinders are at mid stroke and the load "weighed" upon air equal to its weight and the pointer set at Off and pushed into the slot where the gears will again mesh in the previous relative position.

I have described the preferred manner of assembling my invention and have shown the vehicle as having six rear wheels requiring a series of three cylinders on each side and a pair in front, it is obvious however, that a set or pair of two cylinders and wheels in lieu of the three may be used with similar advantage, and that the front cylinders may be replaced by steel springs, also that a multiple of single shutoff cocks may be placed upon the instrument board instead of the combination valve shown, all without departing from the spirit of my invention as defined in the following claims.

I claim:

1. In vehicle body suspension, a set of two or more air cylinders on each rear quarter of the vehicle, another set or pair in front, each set of cylinders being pneumatically connected but isolated from the other sets, one cylinder of each set acting as a pneumatic control through pipe connections to a control valve, and means accessible to the driver for manipulating said control.

2. In vehicle body suspension, cylinder air springs supporting separate portions of the vehicle body, a pneumatic control cylinder on each portion, said control cylinder having telescoping tubes internally thereof adapted to open and close an escape port at approximately mid stroke of the cylinder piston, pipes leading from said cylinder and communicating with means for manually operating the control.

3. In vehicle body suspension, the combination with a vehicle body frame and running gear thereof, of pneumatic cylinders carried by said frame, pistons operated in the cylinders and carried by said running gear, a pair of tubes fixed to each cylinder and piston, one of each pair telescoping the other, a port in one of said tubes adapted to cut off the air supply at approximately mid stroke of the piston travel in the cylinder, pipe lines leading to one of the tubes and means for manually controlling the air supply thereto.

JAMES MADISON THORP.